United States Patent [19]
Hand

[11] Patent Number: 5,648,639
[45] Date of Patent: Jul. 15, 1997

[54] GLANDS FOR TERMINATING CABLES AND PIPES

[75] Inventor: Edward Hand, Stalybridge, England

[73] Assignee: Hawke Cable Glands Limited, England

[21] Appl. No.: 441,727

[22] Filed: May 16, 1995

[30] Foreign Application Priority Data

May 21, 1994 [GB] United Kingdom ............ 9410200

[51] Int. Cl.⁶ ........................................................ H02G 3/18
[52] U.S. Cl. ........................ 174/51; 174/65 SS; 439/98
[58] Field of Search ................................. 285/354, 161;
439/98, 394; 174/65 SS, 51, 65 R, 78

[56] References Cited

U.S. PATENT DOCUMENTS

| | | | |
|---|---|---|---|
| 3,747,960 | 7/1973 | Bawa | 285/354 |
| 4,655,486 | 4/1987 | Tarnay et al. | |
| 4,692,561 | 9/1987 | Nattel | 174/65 SS |
| 4,696,908 | 9/1987 | Gutter et al. | 439/98 |
| 4,739,126 | 4/1988 | Gutter et al. | 174/65 SS |
| 4,983,784 | 1/1991 | Whitlock | 174/65 SS |
| 5,066,248 | 11/1991 | Gaver, Jr. et al. | 439/578 |
| 5,308,122 | 5/1994 | Crawford et al. | 285/52 |

FOREIGN PATENT DOCUMENTS

| | | |
|---|---|---|
| 0 052 037 | 5/1982 | European Pat. Off. . |
| 0 147 218 | 7/1985 | European Pat. Off. . |
| 2 672 105 | 7/1992 | France . |
| 1 615 624 | 6/1971 | Germany . |
| 1083612 | 6/1963 | United Kingdom ........... 174/65 SS X |
| 2 249 433 | 5/1992 | United Kingdom . |
| 93/05547 | 3/1993 | WIPO . |

Primary Examiner—Kristine L. Kincaid
Assistant Examiner—Dhiru R. Patel
Attorney, Agent, or Firm—Larson and Taylor

[57] ABSTRACT

An insulation piercing earthing ring for a gland termination to provide earth continuity between an electrically conductive gland body and an electrically conductive inner sleeve of an insulated cable or pipe has a flat annular washer for locating against the end of the cable or pipe with at least one contact finger extending from the periphery of the washer to surround the cable or pipe and terminating in an inwardly directed projection for piercing the insulation. The contact finger extends axially and radially outwards from the periphery of the washer in the undeformed free state and is deformed radially inwards by engagement with a tapered entry portion of the gland body causing the projection to pierce the insulation and contact the electrically conductive inner sleeve.

12 Claims, 2 Drawing Sheets

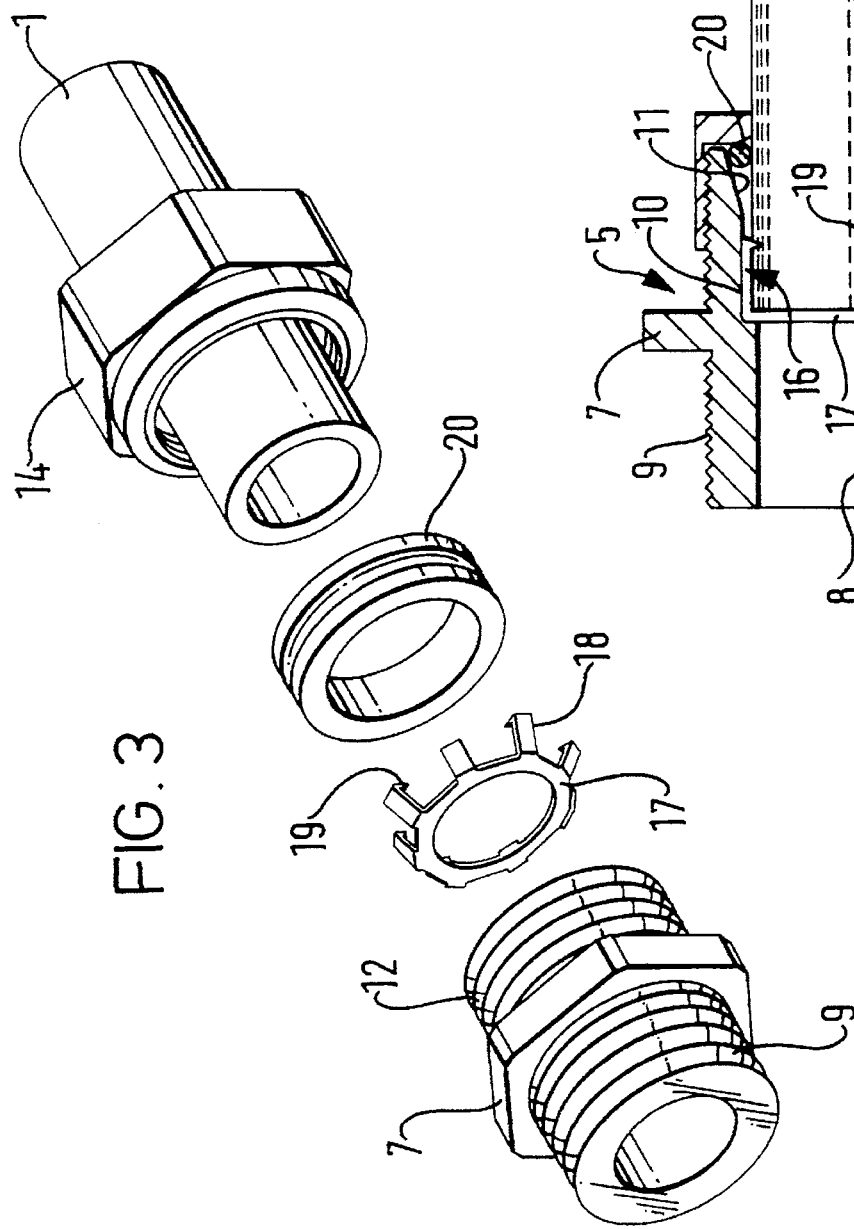
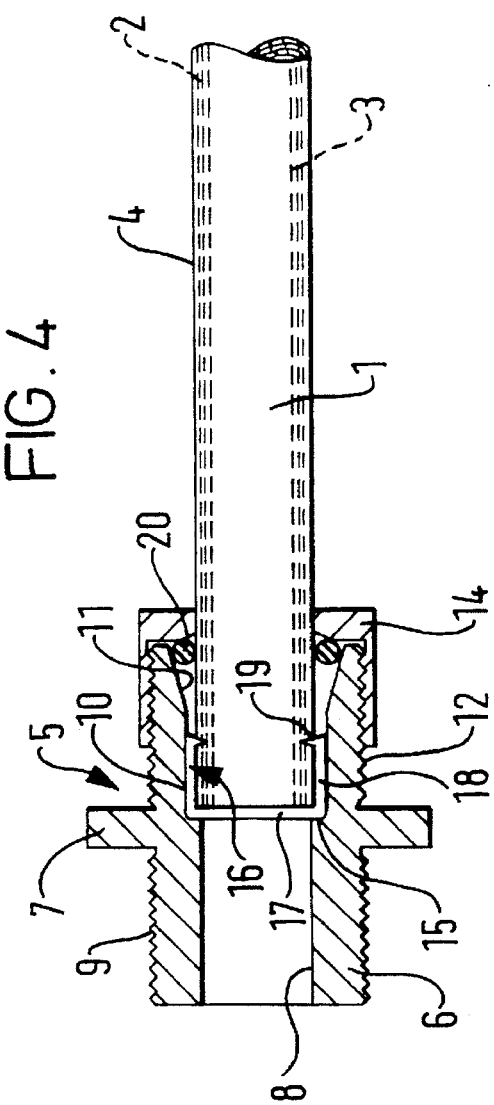

GLANDS FOR TERMINATING CABLES AND PIPES

BACKGROUND OF THE INVENTION

This invention relates to glands for terminating cables and pipes.

The invention has particular application to terminations where good earth continuity is required between electrically conductive parts of the gland and the cable or pipe.

Typically the cable or pipe has an electrically conductive sleeve covered by an outer sheath of electrically insulating material that is received in an electrically conductive body of the gland. Currently, it is the practice to remove the outer insulation to expose the sleeve and to provide an earthing ring in the gland body for making electrical contact between the exposed sleeve and the gland body.

It is an object of the present invention to provide a gland for terminating cables and pipes having an outer sheath of electrically insulating material which provides earth continuity between electrically conductive parts of the gland and the cable or pipe without removing the outer sheath.

SUMMARY OF THE INVENTION

According to one aspect of the invention a gland for terminating cables and pipes having an electrically conductive sleeve covered by an outer sheath of electrically insulating material comprises an electrically conductive gland body to receive the cable or pipe, and an earthing ring adapted to pierce the outer sheath within the gland body and contact the sleeve to provide earth continuity between the sleeve and the gland body.

By arranging for the earthing ring to pierce the outer sheath, earth continuity between electrically conductive parts of the gland and cable or pipe is ensured without removing the outer sheath.

Preferably, the earthing ring has at least one contact finger that extends axially and radially outwards in the undeformed free state and is compressed by engagement with the gland body during assembly to pierce the outer sheath.

Advantageously, the or each contact finger terminates in an inwardly directed projection such as a spike for piercing the outer sheath and contacting the electrically conductive sleeve of the cable or pipe.

Preferably, the gland body has a tapered entry portion for compressing the or each contact finger on insertion of the earthing ring.

Advantageously, the earthing ring comprises a flat washer engaged by the end of the cable or pipe with the contact finger(s) extending from the periphery of said washer.

Preferably, the gland includes means for sealing the outer sheath of the cable or pipe. The sealing means may comprise an annular seal of rubber or like resilient material that is compressed inwardly to engage the outer sheath by threaded engagement of a seal nut with the entry body.

Advantageously, the entry body has a stop that is engaged by the seal nut to control compression of the seal.

According to another aspect of the invention a gland for terminating cables and pipes having an electrically conductive sleeve covered by an outer sheath of electrically insulating material comprises an electrically conductive gland body having an axial opening at one end for receiving the cable or pipe, and an electrically conductive earthing ring receivable in the opening for providing an earth connection between the gland body and the cable or pipe, the earthing ring being a push fit in the opening on insertion of the cable or pipe and having at least one contact finger for surrounding the outer sheath of the cable or pipe with an inwardly directed projection for piercing the outer sheath and contacting the sleeve, the contact finger being arranged to extend axially and radially outwards in an undeformed free state of the earthing ring prior to insertion in the opening and being deflectable inwardly towards the cable or pipe on insertion of the earthing ring into the opening by engagement with a tapered entry portion of the opening causing the projection to pierce the outer sheath and contact the sleeve.

Other features, benefits and advantages of the invention will be apparent from the following description described of exemplary embodiments with reference to the accompanying drawings.

BRIEF DESCRIPTION OF THE DRAWINGS

FIG. 3 is an exploded isometric view of the component parts of the gland shown in FIGS. 1 and 2; and FIG. 4 is a longitudinal sectional view of an assembled termination employing a gland according to a second embodiment of the present invention.

DETAILED DESCRIPTION OF THE EXEMPLARY EMBODIMENTS

Figure 1:
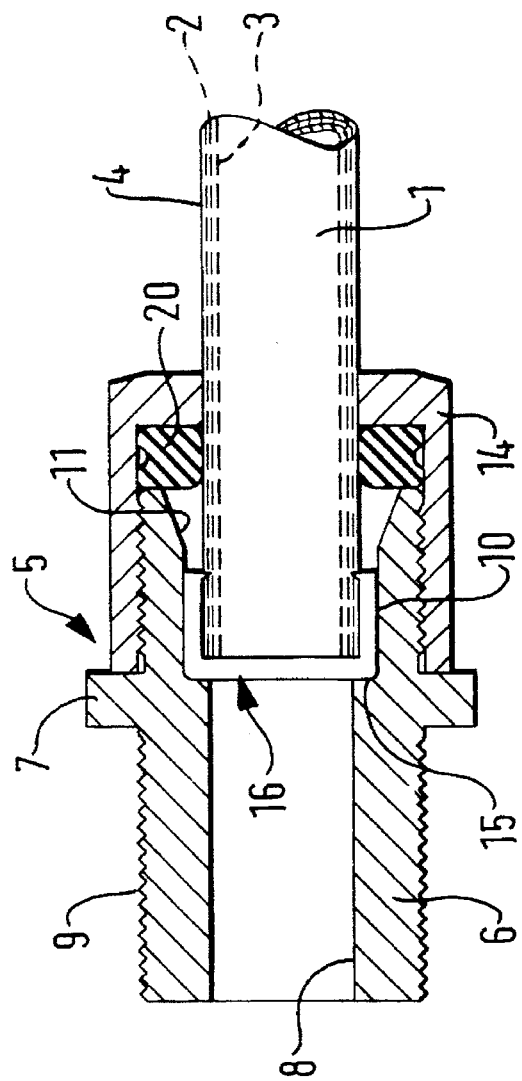
FIG. 1 is a longitudinal sectional view of an assembled termination employing a gland according to a first embodiment of the present invention.
Figure 2:
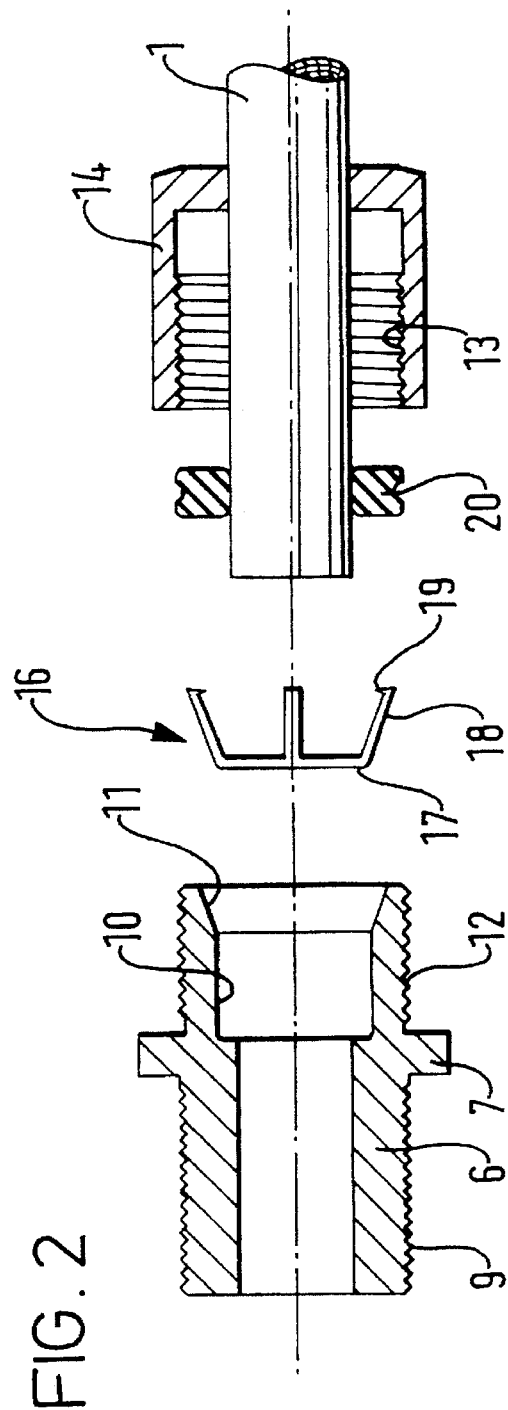
FIG. 2 is an exploded longitudinal sectional view of the termination of FIG. 1 prior to assembly.

With reference to FIGS. 1 to 3 of the accompanying drawings, a composite pipe 1 for one or more conductors (not shown) such as electric cable or fibre optic cable comprises an electrically conductive sleeve 2 sandwiched between inner and outer electrically insulating sheaths 3 and 4 respectively.

In this exemplary embodiment the sleeve 2 is an aluminium tube and the sheaths 3,4 are made of non-conducting plastics having appropriate properties for the intended application.

An earth continuity termination for the pipe 1 is provided by a gland 5 having an electrically conductive entry body 6 formed with an external hexagonal flange 7 for engagement by a spanner or like tool to rotate the entry body 6.

One end of the body 6 has a cylindrical bore 8 and an external thread 9 for securing the entry body 6 to an enclosure such as a junction box or other electrical equipment (not shown) to which the conductor(s) extending through the pipe 1 are connected in known manner.

The other end of the body 6 has a coaxial counterbore 10 with a tapered portion 11 of frusto-conical shape at the outer end and an external thread 12 for threaded engagement with a complementary internal thread 13 of a seal nut 14.

The counterbore 10 terminates at the inner end in an internal shoulder 15 providing a seating for an electrically conductive earthing ring 16.

The ring 16 comprises a flat annular washer 17 sized to fit within the counterbore 10 and provided with a plurality of circumferentially spaced deflectable cantilever contact fingers 18. The contact fingers 18 extend axially and radially outwards from the periphery of the washer 17 in the undeformed free state of the ring 16 and terminate in radially inwardly directed spikes 19.

On assembly, the seal nut 14 and a resilient annular seal 20 of having an external circumferential groove are slipped over the end of the pipe 1. The earthing ring 16 is then positioned with the washer 17 seated against the end of the pipe 1 to axially locate the earthing ring 16 and the contact fingers 18 surrounding and spaced from the outer sheath 4. The end of the pipe 1 and earthing ring 16 are then pushed into the counterbore 10 of the entry body 6 until the washer 17 locates against the shoulder 15.

As the pipe 1 and ring 16 are pushed into the counterbore 10, the contact fingers 18 are compressed radially inwards by engagement with frusto-conical entry portion 11 causing the spikes 19 to pierce the outer sheath 4 and contact the sleeve 2. The pipe 1 and deformed fingers 18 are a close fit in the counterbore 10 when pushed fully home thereby ensuring good earth continuity between the sleeve 2 and entry body 6 through the ring 16.

Finally, the termination is completed by bringing the seal nut 14 into threaded engagement with the entry body 6. As the seal nut 14 is tightened on the entry body 6, the seal 20 is compressed onto the outer sheath 4 of the pipe 1 to provide a fluid-tight seal and strong grip to prevent the pipe 1 being pulled out of the entry body 6. A constant compression of the seal 20 is obtained by tightening the seal nut 14 against the flange 7 of the entry body 6.

FIG. 4 shows a second embodiment in which like reference numerals are used to indicate parts corresponding to the first embodiment above-described. In this embodiment, an O-ring 20 is compressed by engagement with the frusto-conical entry portion 11 on tightening the seal nut 14 to provide a fluid-tight seal and strong grip to prevent the pipe 1 being pulled out of the entry body 6.

As will be appreciated from the foregoing description, the earthing ring 16 ensures that good earth continuity is obtained between the sleeve 2 and entry body 6 on assembly without removing the outer insulation sheath 4 of the pipe 1. Furthermore, by arranging the earthing ring to be a push fit on inserting the cable or pipe 1 with contact fingers 18 that are deflected to pierce the outer insulation sheath 4 of the cable or pipe 1, the required earth continuity is achieved independently of and does not rely on threaded engagement of the seal nut 14 with the entry body 6.

It will be understood that the invention is not limited to terminations for pipes and may be applied to terminations for electric cables in which an outer insulation sheath covers an electrically conductive sleeve such as wire armour or braid.

It will also be appreciated by those familiar in this field that the invention has application to different types of glands for terminating cables and pipes and is not limited to the exemplary gland above-described.

I claim:

1. A gland for terminating a cable or pipe having an electrically conductive sleeve covered by an outer sheath of electrically insulating material comprising an electrically conductive gland body having an axial opening at one end for receiving the cable or pipe, and an electrically conductive earthing ring co-operable with the cable or pipe for push fit reception in said opening on insertion of the cable or pipe in said opening, said earthing ring having at least one contact finger disposed to extend over the outer sheath of the cable or pipe with an inwardly directed projection for piercing the outer sheath and contacting the sleeve for providing an earth connection between said gland body and the cable or pipe, said at least one contact finger being arranged to extend axially and radially outwards of the cable or pipe in an undeformed free state of said earthing ring prior to insertion in said opening and being co-operable with a tapered entry portion of said opening on insertion in said opening to deflect inwardly towards the cable or pipe causing said projection to pierce the outer sheath and contact the sleeve.

2. A gland according to claim 1 wherein said gland body has an internal shoulder for axially locating said earthing ring in said opening.

3. A gland according to claim 1 wherein said earthing ring has a plurality of circumferentially spaced contact fingers.

4. A gland according to claim 1 wherein said earthing ring comprises a flat washer engaged by the end of the cable or pipe with said at least one contact finger extending from the periphery of said washer.

5. A gland according to claim 1 including means for sealing the outer sheath of the cable or pipe.

6. A gland according to claim 5 wherein said means for sealing comprises an annular seal of resilient material that is compressed inwardly to engage the outer sheath by threaded engagement of a seal nut with said gland body.

7. A gland according to claim 6 wherein said gland body has a stop engaged by said seal nut to control compression of said seal.

8. A gland according to claim 6 wherein said seal has an external circumferential groove.

9. A gland according to claim 6 wherein said seal is compressed by engagement with said tapered entry portion of said opening.

10. A gland according to claim 1 wherein said tapered entry portion of said opening is of frusto-conical shape.

11. A gland for terminating a cable or pipe having an electrically conductive sleeve covered by an outer sheath of electrically insulating material comprising a gland body having an opening for receiving the cable or pipe, and an insulation piercing earthing ring for making an electrical connection between said gland body and the sleeve, said earthing ring being co-operable with the cable or pipe for push fit reception in said opening as the cable or pipe is inserted in said opening and having at least one contact arm disposed to extend over the outer sheath of the cable or pipe, and said opening having a tapered entry portion for deflecting said at least one contact arm towards the cable or pipe to pierce the outer sheath and contact the conductive sleeve as the cable or pipe is inserted in said opening.

12. An insulation piercing termination for establishing an electrical connection between an electrically conductive inner sleeve of an insulated pipe and a gland body having an opening for receiving an end of the pipe comprising an insulation piercing earthing ring co-operable with the end of the pipe for push fit reception of said earth ring in said opening, said earthing ring having at least one contact arm with an inwardly directed projection for piercing the insulation and contacting the inner sleeve of the pipe, and said opening having a tapered entry portion co-operable with said at least one contact arm to deflect said contact arm towards the pipe to cause said projection to pierce the insulation and contact the inner sleeve as the end of the pipe is inserted in said opening.

* * * * *